United States Patent Office 3,510,495
Patented May 5, 1970

---

3,510,495
NOVEL SUBSTITUTED 1-AMINO-
2-PYRROLIDINONES
James R. Beck, Indianapolis, Ind., assignor to Eli Lilly
and Company, Indianapolis, Ind., a corporation of
Indiana
No Drawing. Filed June 26, 1967, Ser. No. 649,013
Int. Cl. C07d 27/08
U.S. Cl. 260—326.3                                    6 Claims

---

ABSTRACT OF THE DISCLOSURE

Compounds of the class of 1-amino-3,3-diphenyl-5-methyl-2-pyrrolidinones, useful as hypoglycemic agents, herbicides, anti-bacterials, and mosquito larvicides.

---

BACKGROUND OF THE INVENTION

For many years research has been carried out resulting in the preparation of a variety of substituted pyrrolidinones. The compounds most closely related to those of the instant invention are reviewed below.

In the prior art, Michels et al., J. Am. Chem. Soc., 78, 5349 (1956), teach the preparation of 1-amino-2-pyrrolidinone, useful as an intermediate in organic syntheses.

Further, McKay et al., J. Am. Chem. Soc., 80, 1510 (1958), teach the preparation of 5-methyl-2-pyrrolidinone and its use as an intermediate in the preparation of certain amino acids.

F. J. Marshall, J. Org. Chem., 23, 503 (1958), teaches the preparation of 3,3-diphenyl-2-pyrrolidinone, which is said to possess anticonvulsant activity.

And finally, Craig et al., J. Org. Chem., 22, 510 (1957), teach the preparation of 3,3-diphenyl-5-methyl-2-pyrrolidinone but teach no utility therefor.

The present invention relates to the novel 1-amino-3,3-diphenyl-5-methyl-2-pyrrolidinone and derivatives thereof, which compounds possess interesting hypoglycemic activity. Individual compounds show herbicidal, antibacterial, and mosquito larvacidal activity.

SUMMARY

This invention relates to novel 1-amino-3,3-diphenyl-5-methyl-2-pyrrolidinone and derivatives thereof, having the formula:

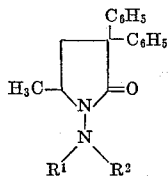

wherein:

$R^1$ is hydrogen, $1_1$–$C_3$ alkyl, $C_2$–$C_3$ alkenyl, or benzyl; and
$R^2$ is hydrogen, $C_1$–$C_3$ alkyl, $C_2$–$C_3$ alkenyl, benzyl, $C_1$–$C_3$ acyl, or ($C_1$–$C_3$)oxycarbonyl.
$C_1$–$C_3$ alkyl means methyl, ethyl, n-propyl, or isopropyl.
$C_2$–$C_3$ alkenyl means vinyl or allyl.
$C_1$–$C_3$ acyl means acetyl, propionyl, or butyryl.
($C_1$–$C_3$)oxycarbonyl means methoxy carbonyl, ethoxycarbonyl, or propoxy-carbonyl.

The novel compounds of this invention has useful hypoglycemic properties as well as being useful herbicides, mosquito larvacides, and antibacterials.

The novel pyrrolidinones of the present invention have been found useful as hypoglycemic agents, i.e., blood sugar lowering agents. This has been demonstrated by administering the compounds orally to rats in dosages ranging from 25 mg./kg. to 100 mg./kg.

Most unexpectedly, one of the novel compounds, 1-diallyl-amino-5-methyl-3,3-diphenyl-2-pyrrolidinone, has shown activity against *Tetrahymena pyriformis* and *Trichomonas vaginalis* 232 when assayed using a standard disk assay method at 40 mcg. of compound per disc for a period of 48 hours.

Another of the novel compounds, 1-benzylamino-5-methyl-3,3-diphenyl-2-pyrrolidinone, has shown antifungal properties when tested against *Rhizoctonia solani*, the causative organism of Rhizoctonia damping-off in cotton; and against *Pythium ultimum*, the causative agent of Pythium damping-off in cotton.

The preparations of the novel compounds of this invention are exemplified as follows. A mixture of ethyl 2,2-diphenyl-4-oxovalerate and a suitable hydrazine, for example, pentamethylene hydrazine, in ethanol is heated to refluxing for a time sufficient to complete the reaction. Other suitable hydrazines include phenylhydrazine, acetylhydrazine, and ethyl carbazate. The reaction time required varies from a few minutes to several hours, depending on the reactants. At the completion of the reaction, the hot reaction product mixture is filtered. The filtrate is cooled in an ice bath, and the product which crystallizes out is recovered by filtering the cold mixture, and is identified as ethyl 2,2-diphenyl-4-oxovalerate pentamethylene hydrazone.

The hydrazone thus prepared is dissolved in glacial acetic acid to which is added about 0.5 g. of platinum oxide catalyst, and the mixture is hydrogenated on a standard Parr apparatus at an initial hydrogen pressure of 40 p.s.i. When the hydrogenation is completed, the reaction product mixture is filtered to remove the catalyst and the filtrate evaporated to dryness in vacuo. The residue thus obtained is recrystallized from a suitable solvent, such as a mixture of ethanol and water, to yield 5-methyl-3,3-diphenyl-2-pyrrolidinone, identified by melting point and elemental analysis.

The following examples describe in detail the methods used in preparing the novel compounds of this invention. However, the invention is not to be construed as limited thereby either in spirit or in scope.

Example 1.—5-methyl-3,3-diphenyl-2-pyrrolidinone

A solution of 15.5 g. (0.041 mole) of ethyl 2,2-diphenyl-4-oxovalerate pentamethylene hydrazone in 135 ml. of glacial acetic acid containing 0.5 g. of platinum oxide was hydrogenated in a standard Parr apparatus at an initial pressure of 40 p.s.i until hydrogen uptake ceased. The reaction product mixture was filtered, and the solvent was evaporated to dryness in vacuo. The residue, weighing 7.2 g., was recrystallized from a mixture of ethanol and water to yield solid product having a melting point of about 161–163° C. and identified as 5-methyl-3,3-diphenyl-2-pyrrolidinone.

Following the same general procedure of Example 1 and using the appropriate starting substituted hydrazone, other compounds were synthesized:

Ethyl 2,2-diphenyl-4-oxovalerate ethoxycarbonyl hydrazone (prepared from ethyl 2,2-diphenyl-4-oxavalerate and ethyl carbazate, and having M.P.=149–151° C.) was hydrogenated as above to yield 1-ethoxycarboxamido-5-methyl-3,3-diphenyl-2-pyrrolidinone. Melting point: 143–145° C.

Ethyl 2,2 - diphenyl - 4 - oxovalerate acetyl hydrazone, (prepared from ethyl 2,2-diphenyl-4-oxovalerate and acetyl hydrazine, and having M.P.=144–146° C.) was hydrogenated as above to yield 1-acetamido-5-methyl-3,3-diphenyl-2-pyrrolidinone. Melting point: 168–170° C.

Example 2.—1-amino-5-methyl-3,3-diphenyl-2-pyrrolidinone

A solution of 10.0 g. (0.032 mole) of 1-acetamido-5-methyl-3,3-diphenyl-2-pyrrolidinone and 20.0 g. of potassium hydroxide in 100 ml. of ethylene glycol was refluxed for 15 hours. The reaction product mixture was poured into water and the resulting mixture carefully acidified with aqueous concentrated hydrochloric acid. The acidified mixture was extracted with several 50-ml. portions of chloroform, and the combined chloroform extracts washed twice with 100-ml. portions of distilled water and dried over anhydrous magnesium sulfate. The drying agent was filtered off and the chloroform solution evaporated to dryness in vacuo. The crude product weighed 5.3 g. and was recrystallized from a mixture of ethanol and water to yield 1-amino-5-methyl-3,3-diphenyl-2-pyrrolidinone having a melting point of about 99–103° C.

Example 3.—1-dimethylamino-5-methyl-3,3-diphenyl-2-pyrrolidinone

A mixture of 2.88 g. of 1-amino-3,3-diphenyl-5-methyl-2-pyrrolidinone (prepared as in Example 2), 2.5 g. of sodium carbonate, 30 ml. of methanol and 10 ml. of methyl iodide was refluxed for a period of 96 hours. The reaction product mixture was cooled, poured into water, and concentrated in vacuo. The remainder was extracted with chloroform, the chloroform layer washed with water, dried, and concentrated in vacuo to dryness. The residue was recrystallized from ether to yield a hygroscopic product, which was recrystallized from a mixture of ethanol and water to yield a product having a melting point of about 64–65° C., and identified as 1-dimethylamino-5-methyl-3,3-diphenyl-2-pyrrolidinone.

Example 4.—1-benzylamino-5-methyl-3,3-diphenyl-2-pyrrolidinones

A mixture of 10.6 g. of 1-amino-5-methyl-3,3-diphenyli-2-pyrrolidinone, 13.8 g. of anhydrous potassium carbonate, 50 ml. of benzyl bromide, and 150 ml. of dry methanol was refluxed for about 114 hours. The reaction product mixture was poured into water, concentrated in vacuo to remove the methanol solvent, and extracted with about 200 ml. of chloroform. The chloroform extract was washeo with water, dried, filtered and concentrated to dryness under reduced pressure. The residue was subjected to thin layer chromatography on silica gel in benzene-ethyl acetate 20:1. The solvent was removed to yield 16.8 g. of oil. This oil was chromatographed over 240 g. of silica gel using benzene-ethyl acetate (20:1 ratio) as solvent. Fractions of 15 ml. volume were collected. Fractions 21–24 inclusive were combined and concentrated to dryness in vacuo to yield 5.54 g. of a solid which was recrystallized from a mixture of ethanol and water to yield product weighing 4.17 g., melting at about 83–84° C., and identified by elemental analysis as 1-dibenzyl-amino-5-methyl-3,3-diphenyl-2-pyrrolidinone.

Fractions 49–74 were combined and concentrated to yield an oil weighing 2.8 g. This oil was cryrstallized from ethanol to yield a product having a melting point of about 78–79° C., and identified by elemental analysis as 1-benzylamino-5-methyl-3,3-diphenyl-2-pyrrolidinone.

Following the same general procedure outlined above, but using appropriate starting materials, the following compounds were prepared:

1 - diallylamino-5-methyl-3,3-diphenyl-2-pyrrolidinone from 1 - amino - 5 - methyl-3,3-diphenyl-2-pyrrolidinone and allyl bromide. Melting point: 77–78° C.

1 - diethylamino-5-methyl-3,3-diphenyl-2-pyrrolidinone from 1 - amino - 5 - methyl-3,3-diphenyl-2-pyrrolidinone and ethyl iodide. Melting point: 92–94° C.

1 - ethylamino - 5 - methyl-3,3-diphenyl-2-pyrrolidinone from 1 - amino - 5 - methyl-3,3-diphenyl-2-pyrrolidinone and ethyl iodide. Melting point: 53–55° C.

Example 5.—1-di(n-propyl)amino-5-methyl-3,3-diphenyl-2-pyrrolidinone

A solution of 1.27 g. of 1-diallylamino-5-methyl-3,3-diphenyl-2-pyrrolidinone in 60 ml. of ethanol containing about 0.5 g. of platinum oxide catalyst was hydrogenated for about 3 hours at atmospheric pressure. The reaction product was then filtered to remove the catalyst and the filtrate concentrated to dryness in vacuo. The residue was recrystallized from a mixture of ethanol and water to yield 0.93 g. of product having a melting point of about 45–47° C. and identified as 1-di(n-propyl)amino-5-methyl-3,3-diphenyl-2-pyrrolidinone.

Example 6.—3,3-diphenyl-5-methyl-1-(N-methylacetamido)-2-pyrrolidinone

To 50 ml. of dry dimethylformamide was added 1.47 g. (0.033 mole) of a 53 percent dispersion of sodium hydride in mineral oil. The mixture was stirred and a solution of 9.25 g. (0.03 mole) of 1-acetamido-5-methyl-3,3-diphenyl-2-pyrrolidinone in 50 ml. of dry dimethylformamide was added dropwise, and stirring continued at room temperature for about 45 minutes. To the stirred mixture was then added dropwise 8.52 g. of methyl iodide and the reaction mixture stirred for about 2 hours at a temperature of about 55–60° C. The reaction product mixture was allowed to come to ambient room temperature and poured into about 250 ml. of ice water. A solid material crystallized out and was filtered off. The solid was recrystallized from ethyl acetate to yield crystalline product weighing about 7.2 g. and having a melting point of about 139–142° C. It was identified by elemental analysis and nuclear magnetic resonance spectrum as 3,3-diphenyl-5-methyl-1-(N-methylacetamido)-2-pyrrolidinone.

Example 7.—1-methylamino-5-methyl-3,3-diphenyl-2-pyrrolidinone

A mixture of 3.087 g. of 3,3-diphenyl-5-methyl-1-(N-methylacetamido)-2-pyrrolidinone and 60 ml. of aqueous 50 percent sulfuric acid was refluxed for about 3 hours. The reaction product mixture was poured into ice water and the mixture made basic by adding aqueous 50 percent sodium hydroxide. The basic mixture was extracted several times with chloroform, the extracts combined, washed with distilled water, dried, and concentrated to dryness in vacuo. The residue was recrystallized from a mixture of ethanol and water to yield 1.056 g. of product having a melting point of about 75–77° C. and identified as 1-methylamino-5-methyl-3,3-diphenyl-2-pyrrolidinone.

I claim:
1. A compound of the following formula:

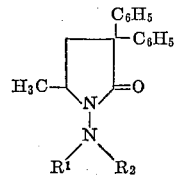

wherein:

$R^1$ is hydrogen, $C_1$–$C_3$ alkyl, $C_2$–$C_3$ alkenyl, or benzyl; and $R^2$ is hydrogen, $C_1$–$C_3$ alkyl, $C_2$–$C_3$ alkenyl, benzyl, $C_1$–$C_3$ acyl, or ($C_1$–$C_3$)oxycarbonyl.

2. A compound as in claim 1, said compound being 1-dimethylamino-5-methyl-3,3-diphenyl-2-pyrrolidinone.

3. A compound as in claim 1, said compound being 3,3-diphenyl-5-methyl-1-methylamino-2-pyrrolidinone.

4. A compound as in claim 1, said compound being 1-acetamido-3,3-diphenyl-5-methyl-2-pyrrolidinone.

5. A compound as in claim 1, said compound being 1-amino-3,3-diphenyl-5-methyl-2-pyrrolidinone.

6. A compound as in claim 1, said compound being 1-ethoxycarboxamido-5-methyl - 3,3 - diphenyl-2-pyrrolidinone.

References Cited

Chemical Abstracts, Pagliarini et al., vol. 65 (1966), p. 7125.

ALEX MAZEL, Primary Examiner

B. I. DENTZ, Assistant Examiner

U.S. Cl. X.R.

260—999; 71—95